Dec. 8, 1964 T. E. DALTON 3,160,259
METHOD OF AND APPARATUS FOR TRANSFERRING
ARTICLES BETWEEN CONVEYORS
Filed June 24, 1959 4 Sheets-Sheet 1

INVENTOR.
THOMAS E. DALTON
BY
Burton & Parker
ATTORNEYS

INVENTOR.
THOMAS E. DALTON
BY
Burton & Parker
ATTORNEYS

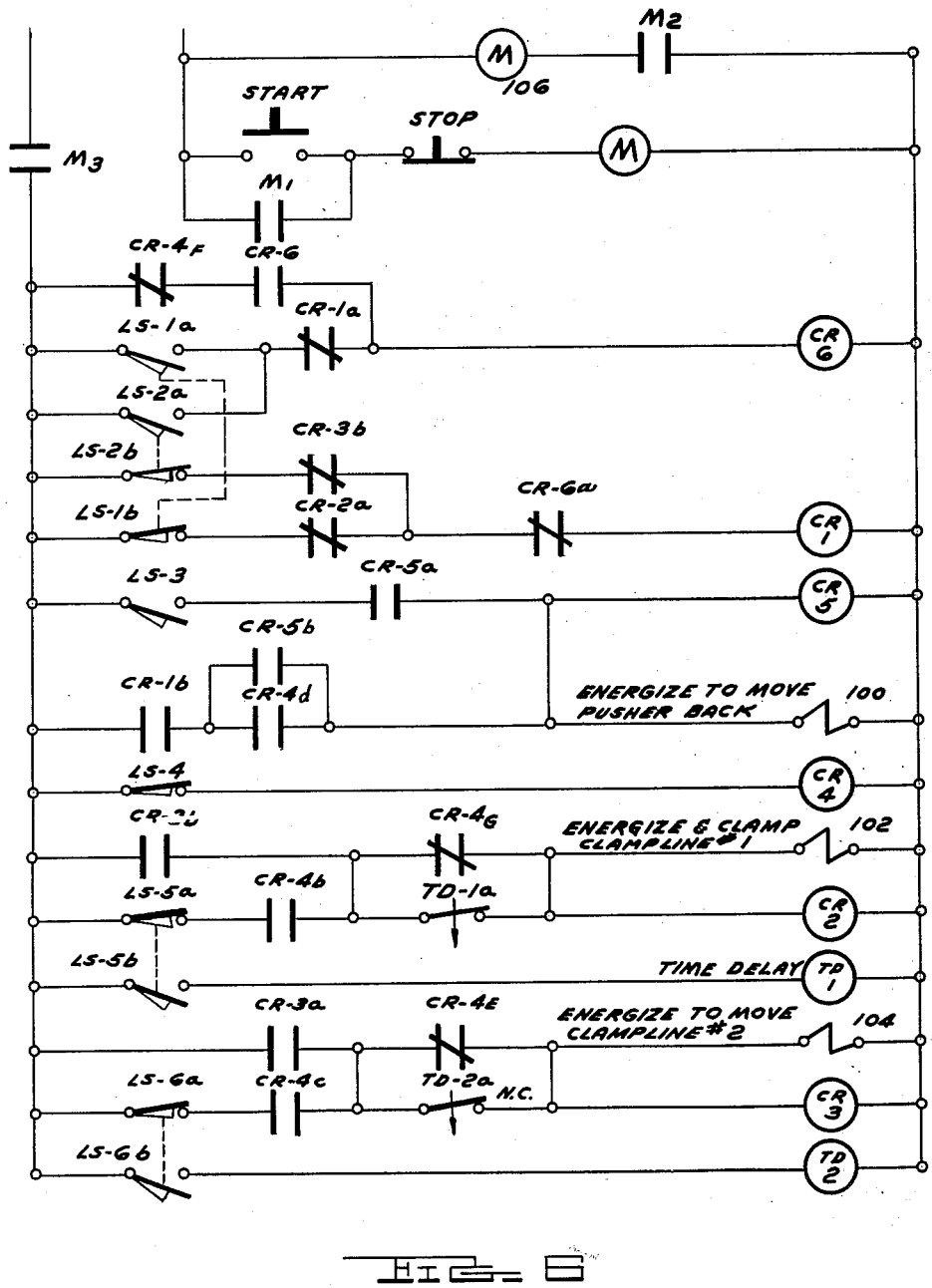

United States Patent Office 3,160,259
Patented Dec. 8, 1964

3,160,259
METHOD OF AND APPARATUS FOR TRANSFERRING ARTICLES BETWEEN CONVEYORS
Thomas E. Dalton, Northampton, Mass., assignor, by mesne assignments, to Cesco Container Mfg. Corp., Northampton, Mass., a corporation of Massachusetts
Filed June 24, 1959, Ser. No. 822,677
10 Claims. (Cl. 198—21)

This invention relates to a method of and apparatus for transferring articles from two or more infeed conveyors, which may deliver articles at varying rates, to one or more outfeed or discharge conveyors, and has particular utility in the transfer of milk cartons in dairies from two or more conveyors, receiving the cartons from filling and sealing machines, to one or more conveyors leading toward a case-filling machine. In the dairy industry it frequently becomes desirable to deliver the output from two or more carton-filling and sealing machines to a single case-filling machine, but because the filling and sealing machines may not have equal output speeds, or because one may be shut down temporarily while the others operate, a traffic control problem in the delivery of the cartons to the case-filling machine arises. Conventional apparatus for transferring articles from a plurality of infeed conveyors, such as the conveyors receiving the output from the filling and sealing machines, to one or more outfeed conveyors, such as the conveyors delivering cartons to the case-filling machine, will not automatically handle a control problem arising when one of the filling and sealing machines is temporarily shut down or when the rate of carton delivery from the respective machines varies. In conventional transfer apparatus the transfer of articles from a plurality of infeed to one or more discharge or outfeed conveyors is dependent upon a continuous flow of articles on each infeed conveyor, and should the flow on one infeed conveyor be slower than the flow on another, the transfer operation slows down because it is dependent in its nature upon the slowest feed rate of the infeed conveyors. Also, in conventional transfer apparatus, if the feed on one of the infeed conveyors stops altogether, the transfer apparatus will stop functioning, and it is necessary to make some manual adjustment to allow the transfer apparatus to continue functioning.

The primary object of the invention is the provision of a method and apparatus for transferring articles from a plurality of infeed conveyors to one or more outfeed conveyors at a speed automatically responsive to, and sufficient to accommodate, the highest delivery rate of any one infeed conveyor, and simultaneously and without slowing the transfer speed, automatically responsive to the slower delivery rate of the other infeed conveyors to accommodate and transfer articles therefrom to the outfeed conveyor.

Another object of the invention is the provision of a method and apparatus for transferring articles as aforesaid wherein the transfer operation will automatically continue as long as any articles continue to be delivered on any of the infeed conveyors.

Other objects, advantages, and meritorious features will more fully appear from the specification, claims, and accompanying drawings, wherein:

FIG. 1 is a top view of mechanism embodying the invention;

FIG. 2 a cross sectional view taken on the line 2—2 of FIG. 1;

FIG. 4 is a cross sectional view taken on the line 4—4 of FIG. 1;

FIG. 6 is a schematic drawing of the electric control circuits of the mechanism shown in FIG. 1.

Figure 1:
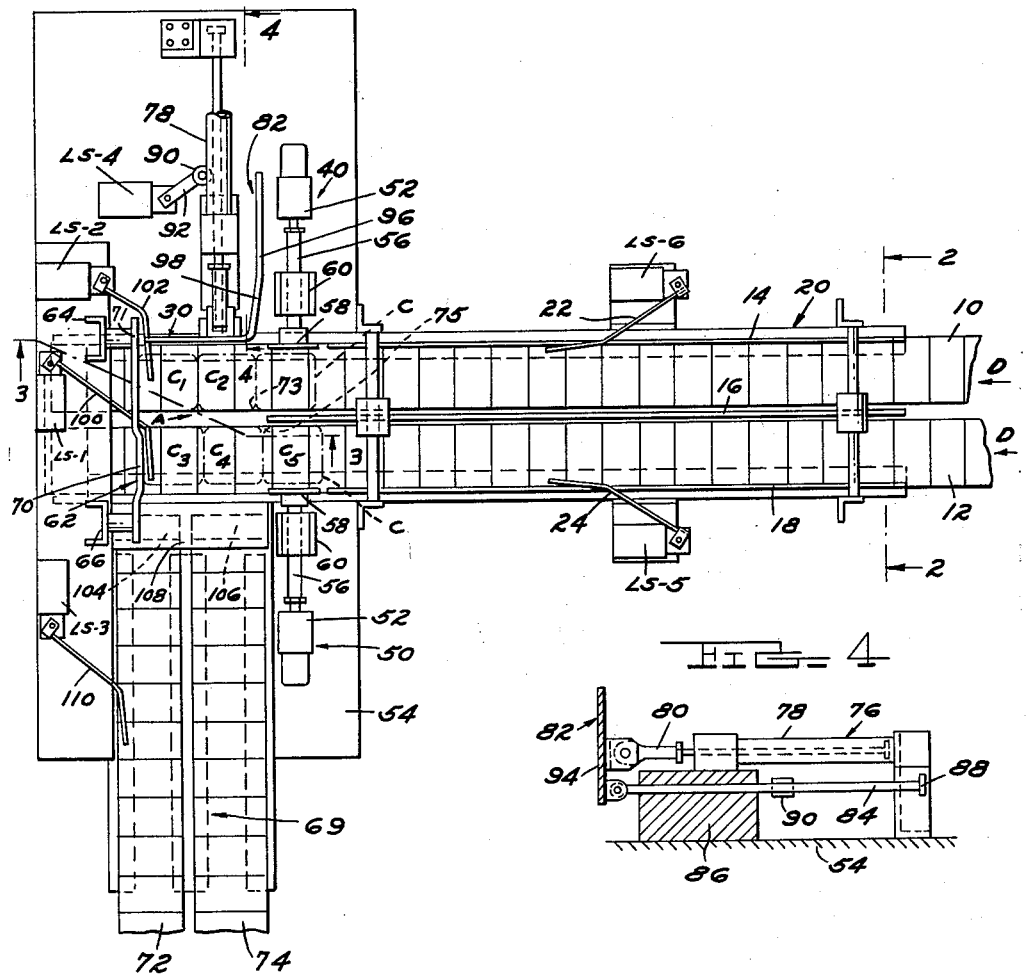
Figure 2:
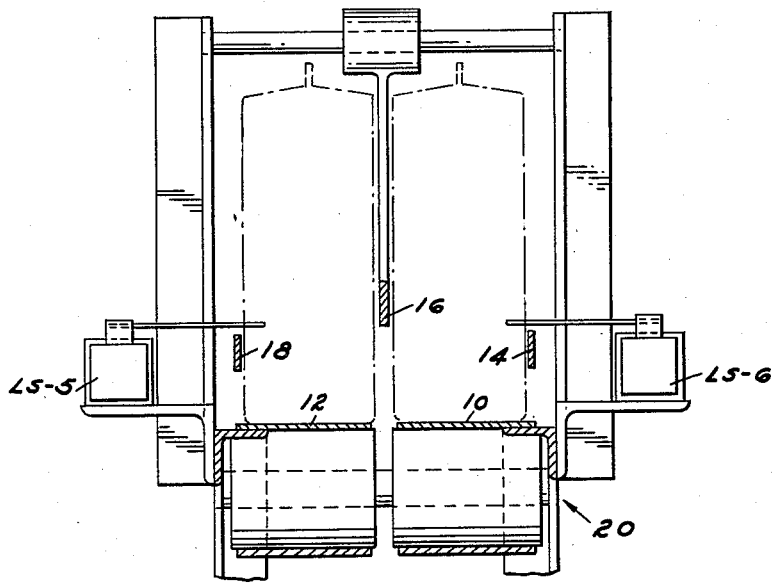

The embodiment of the invention shown in FIG. 1 is adapted to transfer articles moving on a plurality of infeed conveyors 10 and 12 to one or more discharge conveyors, and as shown in FIG. 1, a single discharge conveyor 69 having conveyor spans 72 and 74 receives the articles transferred from conveyors 10 and 12. Article transfer mechanism generally indicated at 30 will automatically transfer articles from the infeed conveyors at a rate sufficient to accommodate the fastest delivery rate of either infeed conveyor to prevent an undesirable accumulation of articles thereon awaiting transfer, while at the same time article withholding means 40 and 50 operable in controlled relation with the speed of transfer of articles by the transfer means 76 and also operable in response to the rate at which articles are delivered on the infeed conveyors, serve to allow the transfer of articles from the slower delivery rate infeed conveyor without interrupting the speed of article transfer as determined by the higher delivery rate infeed conveyor. The embodiment shown will continue to transfer articles as long as any continue to be delivered. The two infeed conveyors 10 and 12, each of which may comprise conventional link belt article-supporting spans entrained over suitable pulleys, deliver the articles between spaced article-guide walls 14, 16, and 18, which are supported in any convenient fashion on the conveyor frame generally indicated at 20. Articles on such conveyors are shown in phantom outline at C. As the articles move on these conveyors in the direction of arrows D in FIG. 1, they strike and actuate the switch arms 22 and 24 of switches LS–5 and LS–6 mounted in any suitable fashion on the conveyor framework 20. These switches are of conventional construction and are schematically shown in FIG. 6 and need not be further described. If the disclosed embodiment is installed in a diary to handle the output of two milk carton filling and sealing machines, each infeed conveyor would receive the output from one of these machines, while the double line outfeed or discharge conveyor would deliver the cartons to a case-filling machine.

After passing by switches LS–5 and LS–6, the articles approach the transfer area generally indicated at A. At the downstream end of the spaced guide walls 14, 16, and 18 are the article withholding means which prevent or allow the discharge of articles from conveyors 10 and 12 into the transfer area A. Such means comprise a pair of article clamps 40 and 50 disposed on opposite sides of the two conveyors and operable when energized to be extended to prevent entry of the articles C into the area A. Each clamp includes a fluid pressure cylinder 52 mounted in any convenient fashion on the base plate 54 of the machine and connected by a connecting rod 56 to a presser plate 58. Each of the rods 56 is supported for reciprocation within a bearing block 60. In FIG. 1 the pressers or clamps 40 and 50 are shown in their retracted position to allow cartons on conveyors 10 and 12 to enter the transfer area. Upon energization of the clamps to extend the presser plates 58, cartons disposed between the presser plates and the marginal end portion of guide wall 16 will be gripped and entry into area A prevented.

Figure 3:
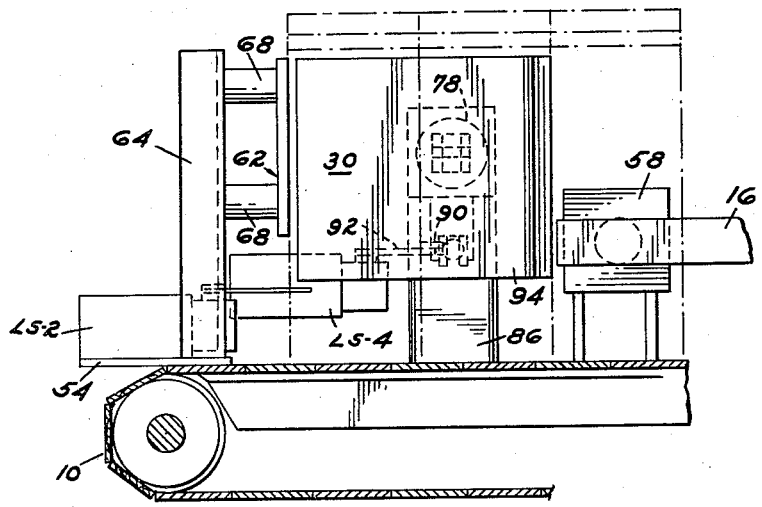
FIG. 3 is a cross sectional view taken on substantially the line 3—3 of FIG. 1.

At that side of the transfer area A opposite conveyors 10 and 12 is a guide wall 62. As the articles enter the area they are brought to rest by abutment with the wall 62. Such wall is supported by a pair of uprights 64 and 66 one of which is shown in FIG. 3. Each upright is secured at its lower end to the base plate 54 and is provided with a pair of spacers 68 which are secured to the upright and to the wall 62. Wall 62 has offset portions 70 and 71 disposed opposite the discharging end of conveyors 12 and 10 respectively for a purpose hereinafter described.

Operable to sweep articles in the transfer area therefrom and onto the discharge conveyor 69 is the article transfer mechanism in the form of a pusher generally indicated at 30. Such transfer means is mounted on the base plate 54 as shown in FIG. 4. The pusher includes a fluid pressure cylinder 78 having a piston rod 80 connected to a generally L-shaped pusher bar 82. Extending rearwardly from the pusher bar is a combination guide and switch-operating rod 84. The rod 84 and the forward end of fluid pressure cylinder 78 are supported by a block 86 as shown in FIG. 4, rod 84 slidably extending through block 86. Rod 84 prevents pivoting of the pusher bar 82 upon its connection with the piston rod 89. The rear end of rod 84 is provided with an enlargement 88 adapted to engage the roller 90 mounted on the switch-actuating arm 92 of switch LS-4 mounted on base plate 54. The enlargement 88 is adapted to strike the roller 90 to actuate LS-4 when the pusher is in its extended position.

The pusher bar 82 has a front face portion 94 which is adapted to engage and sweep from the transfer area A any articles disposed therein when the pusher moves from the retracted position shown in FIG. 1 to an extended position. In the extended position the front wall portion 94 of the pusher bar 82 is disposed just beyond a position of alignment with wall 18 of infeed conveyor 12. Extending rearwardly of the front wall portion 94 and at one side thereof is a blocking wall or plate 96 which tapers as shown at 98. This taper is provided to prevent the front wall portion from catching on cartons standing on conveyor 10 or 12 at the time the pusher moves to its extended position.

Also mounted on base plate 54 are a pair of switches LS-1 and LS-2. They are provided respectively with actuating arms 100 and 102. Arm 100 extends through a slot provided in wall 62. These switches are adapted to be actuated when articles C fill the transfer area.

Discharge conveyor spans 72 and 74 are entrained at one end around suitable pulleys or the like 104 and 106 disposed immediately beneath a dead plate or discharge area 108. When the pusher is in the extended position, those articles, against which the front wall portion 94 of the pusher abuts, stand on the dead plate or discharge area 108 and remain thereon after the pusher retracts to the position shown in FIG. 1. Such cartons are thereafter moved off of the dead plate and onto conveyors 72 and 74 when the pusher is again extended, sweeping articles from the transfer area.

A safety switch LS-3 is also mounted on the base plate 54 and is provided with an actuating arm 110 which is adapted to be moved by articles moving on conveyor 69. If switch LS-3 is held closed by articles standing on conveyor 69 adjacent switch arm 110, the pusher 30 is prevented from operating and jamming another load of articles being swept from the transfer area against articles standing adjacent switch LS-3.

In general the operation of the mechanism shown in FIG. 1 is as follows. Prior to the mechanism being energized, the pusher 30 is in the extended position such that the L-shaped pusher bar 82 has its rearwardly extending gate portion 96 blocking discharge of articles on conveyors 10 and 12 into the transfer area A. Clamps 40 and 50 are also in their extended positions. When articles have accumulated on conveyors 10 and 12 from the clamps rearwardly to the switch arms 22 and 24 of switches LS-5 and LS-6, they hold such switches actuated and with the switches held actuated for a determined interval of time, the control system to which the switches are connected will cause the clamps to retract and thereafter the pusher to retract from an extended position to the position shown in FIG. 1 to allow articles to enter the transfer area.

The clamps are operative to retract or to extend only when the pusher is in the extended position. The pusher will be caused to move to the extended position from the retracted position shown in FIG. 1 when either switch LS-1 or LS-2 is actuated by cartons entering the transfer area from either conveyor 10 or 12. In the event there is a failure of cartons to build up on one or the other of conveyors 10 and 12 from the presser plates 58 back to switches LS-5 and LS-6, that conveyor on which there is a failure of article build-up will be prevented from discharging articles into the transfer area as the clamp associated with such conveyor will not retract. If the pusher has commenced retracting toward the position shown in FIG. 1 prior to a sufficient build-up on one of the conveyors to cause its associated clamp to retract, the clamp will be prevented from retracting until the pusher returns to the extended position so there is no possibility of a carton commencing to enter the transfer area during pusher retraction or extension. In other words, if conveyor 12 builds up articles from the presser plate 58 of the withholding device 50 back to switch LS-5 so that switch LS-5 is held actuated for a given time interval, then presser 50 will retract, provided the pusher is in the extended position, and allow articles to enter the transfer area, even though articles have not built up on conveyor 10 to hold switch LS-6 actuated for a given time interval. With LS-1 actuated by the entry of articles from conveyor 12, the pusher will immediately extend to push the articles out of the transfer area. If, while pusher 30 is retracting or while in the retracted postion article build-up on conveyor 10 occurs holding switch LS-6 actuated for the required time interval, because the pusher is not in the extended position, clamp 40 will not retract and articles will be prevented from entering the transfer area from conveyor 10. Clamp 40 will not be allowed to retract until the pusher has returned to the extended position sweeping articles in the transfer area therefrom.

It will be noted that the rate at which articles are transferred from the infeed conveyors is determined by the highest delivery rate infeed conveyor while at the same time accommodating the slower delivery rate conveyor without slowing the transfer operation. It will also be appreciated that should the delivery of articles on one of the infeed conveyors cease altogether, the transfer operation will nevertheless continue as long as articles are being delivered by the other infeed conveyor.

The offset portions 70 and 71 of wall 62 serve to stagger in offset relation the articles $C_1$ and $C_2$ from articles $C_3$ and $C_4$ so that as the pusher 30 is extended the leading corner 73 of article $C_2$ will not catch on the corner 75 of article $C_5$. The offset portion 70 is not evenly aligned with the conveyor 12 but slightly displaced in direction of article transfer out of area A, so that articles $C_1$ and $C_2$ will move between wall 62 and article $C_5$ before articles $C_3$ and $C_4$ have allowed $C_5$ to shift toward wall 62 and catch the corners 73 and 75 of articles $C_2$ and $C_5$.

The system for controlling the automatic operation of the article distributor is schematically shown in FIG. 6. An electric motor 106 driving a fluid pressure pump (not shown) is connected in series with the relay contacts $M_2$ of the motor relay M so that upon depression of the start button, the motor 106 is energized. The fluid pressure pump connected to the motor is communicatively coupled in any convenient arrangement with the fluid pressure cylinders hereinabove mentioned with the communication being controlled by solenoid-operated valves. For the pusher cylinder a solenoid 100 is suitably connected to a valve in the fluid pressure circuit so that upon energization of solenoid 100 the valve is shifted to cause the pusher 30 (see FIG. 1) to retract and upon de-energization of such solenoid the valve is spring returned to a position causing pressurization of the pusher cylinder to cause the pusher to be extended. Each of the clamping cylinders is controlled by a similar fluid pressure valve. For example, the cylinder 40 is controlled by a valve whose solenoid 102 upon energization causes pressurization of the cylinder to extend the clamp to grip a carton disposed in front of the clamp. Upon de-energization of solenoid 102, a spring return in the solenoid controlled valve causes reverse pressurization of the cylinder and retraction of the clamp. Solenoid 104 is connected to a valve for controlling operation of the other clamping cylinder 50 and functions in the same fashion as solenoid 102.

Before explaining the operation of the control system it should be noted that clamping or unclamping of either line of articles feeding into the distributor is accomplished only while the pusher is in the extended position. Once the pusher commences to retract the clamps are prevented from operation until the pusher returns to its completely extended position. Assuming that the start button is pushed and that no articles are present in the distributor, the pusher will be in the extended position with the clamps extended. As cartons enter the distributor on either one of the infeed conveyors, they close the contacts LS–$5_b$ and LS–$6_b$ of switches LS–5 and LS–6 depending upon which infeed conveyor may be feeding cartons. Once a complete solid line of cartons builds up on either of the conveyors to hold either LS–5 or LS–6 actuated for a determined length of time, the clamp cylinder of such conveyor line will cause retraction of its clamp to allow cartons on such conveyor to feed in front of the pusher after the pusher has retracted. The pusher will retract once there is a sufficient build-up of cartons on either of the infeed conveyors. If the build-up on either conveyor is sufficient to hold the switch LS–5 or LS–6 closed during the determined time interval and the pusher retracts, the clamp of that infeed conveyor which did not retract because of a failure of carton build-up on such conveyor will not retract while the pusher is retracted.

Considering the control circuit of FIG. 6 in detail, solenoid M, in addition to starting the motor 106 by closing the relay contacts $M_2$, closes contacts $M_1$ to keep the motor operating though the start button thereafter opens. Solenoid M also closes the relay contacts $M_3$ to allow energization of the control circuits hereinafter described. Upon energization of such control circuits, relay CR–1 is energized opening normally closed relay switch CR–$1_a$ and closing CR–$1_b$. LS–4 is closed because the pusher is in the extended position and this energizes relay CR–4. Energization of relay CR–4 closes CR–$4_b$ completing a circuit to relay CR–2 and solenoid 102 causing the clamp controlled by solenoid 102 to be extended. CR–$4_c$ is also closed serving to energize solenoid 104 to extend the clamp controlled thereby and also energize CR–3. Upon energization of relay CR–2, CR–$2_a$ is opened preventing energization of relay CR–1. With CR–1 de-energized, the pusher cannot retract. The status of the control circuit, therefore, after the start button has been pushed and before any articles enter the device, is as follows: the motor is running, the pusher is extended, the clamps are extended, CR–1 is de-energized while CR–4, CR–2, and CR–3 are all energized, and LS–4, LS–$1_b$, LS–$2_b$, LS–$5_a$, and LS–$6_a$ are all closed.

With cartons now entering the distributor on the infeed conveyors, and assuming that they enter on both conveyors at the same rate, LS–$5_a$ and LS–$6_a$ will be opened while the associated contacts LS–$5_b$ and LS–$6_b$ will be closed. Closure of the latter will energize the time delay relays TD–1 and TD–2 and if these are held energized sufficiently long, by the presence of cartons, they will cause their enslaved switches TD–$1_a$ and TD–$2_a$ to open. When TD–$1_a$ opens, CR–2 is de-energized and the solenoid 102 is de-energized causing the associated clamp to retract. The same occurs with respect to TD–$2_a$ causing solenoid 104 to be de-energized and retraction of its associated clamp.

When TD–$1_a$ and TD–$2_a$ open, they serve to de-energize relays CR–2 and CR–3, which in turn serve to energize relay CR–1. With CR–1 energized, its slave switch CR–$1_b$ is closed and through closed CR–$4_d$, pusher solenoid 100 is energized causing the pusher to retract. Closure of CR–$1_b$ also energizes relay CR–5 in turn locking closed CR–$5_b$ around CR–$4_d$. With the pusher retracted, LS–4 is opened de-energizing relay CR–4 and causing all of the enslaved CR–4 switches to assume their normal positions. The clamps controlled by solenoids 102 and 104 are held in the retracted position by the opening of enslaved switches CR–$2_b$, CR–$3_a$, CR–$4_b$, and CR–$4_c$.

With the pusher retracted and the clamps retracted, cartons may now enter the transfer area in front of the pusher. When the area is filled, the cartons will contact switches LS–1 and LS–2, causing contacts LS–$1_a$ and LS–$2_a$ to close while LS–$1_b$ and LS–$2_b$ are opened. When LS–$1_b$ or LS–$2_b$ is opened, relay CR–1 is de-energized. With CR–1 de-energized, the contacts CR–$1_a$ are closed, and because both LS–$1_a$ and LS–$2_a$ are closed, relay CR–6 is energized. With CR–1 de-energized, contacts CR–$1_b$ are opened thereby de-energizing the pusher solenoid 100 and causing the pusher to extend to push the cartons in front of it out and onto the discharge conveyor.

As the cartons leave the transfer area and pass onto the discharge conveyor, they contact switch LS–3, which is thereby closed but has no effect as long as relay contacts CR–$5_a$ are open. If CR–$5_a$ is closed as a result of the pusher solenoid being energized and the pusher therefore is in the retracted position, then if LS–3 is closed by a backing of cartons on the discharge conveyor, the pusher solenoid will remain energized even though relay CR–1 is de-energized as a result of closure of switches LS–$1_a$ or LS–$2_a$, so that the pusher does not jam another carton against the backlog. In other words, switch LS–3 serves as a safety device.

When the pusher again reaches the extended position, LS–4 is once again closed. If there is a build-up of cartons on both infeed conveyors, the pusher will immediately retract when LS–4 closes because CR–2 is still de-energized (because LS–$5_b$ has not opened) and CR–$2_a$ is therefore closed. The closure of LS–4 has energized CR–4, which in turn closes contacts CR–$4_d$ to energize the pusher solenoid 100 causing the pusher to retract and the cycle repeats itself.

In the event that, for example, there is not a sufficient build-up of cartons to hold LS–$6_b$ closed and LS–$6_a$ open, then time delay relay TD–2 will be de-energized. When TD–2 is de-energized because of a failure of the cartons to maintain a sufficient backing on the infeed conveyor, the time delay relay contacts TD–$2_a$ will close and because the pusher is in the extended position and for such reason contacts CR–$4_c$ are closed, the solenoid 104 will be energized to extend the associated clamp and prevent entry of cartons into the transfer area when the pusher retracts. Because clamping and unclamping by the solenoids 102 and 104 occurs only when the pusher is in the extended position with LS–4 and relay CR–4 closed and energized respectively, unless LS–$6_b$ is closed long enough prior to retraction of the pusher so that time delay relay TD–2 can time out and open contacts TD–$2_a$ before contact CR–$4_c$ is opened to kill relay CR–3 and thereby open contacts CR–$3_a$ to de-energize the solenoid 104, the associated clamp for solenoid 104 will remain energized as the pusher retracts and contacts CR–$4_c$ are opened.

Figure 5:
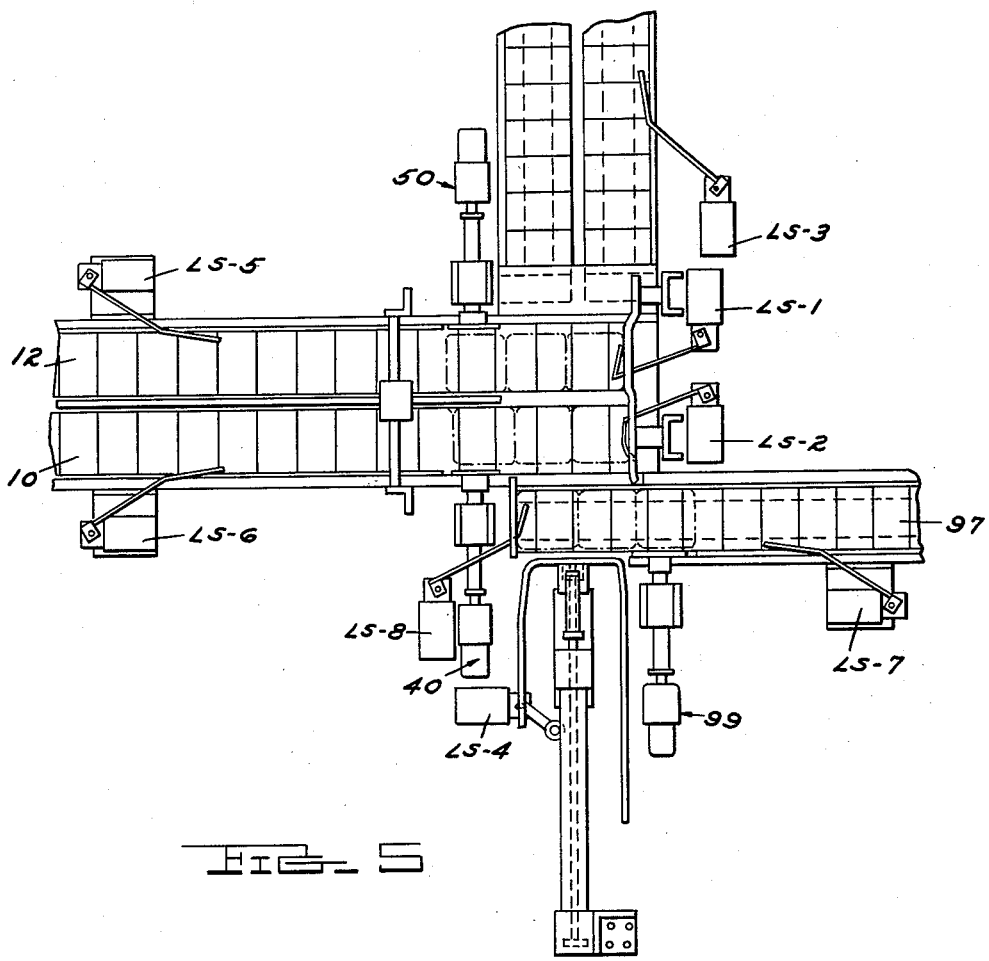
FIG. 5 is a top view of a slightly modified form of the invention.

With the above description of the control system for the device, it will be apparent to those skilled in the art that the system may be extended by the addition of circuits similar to those shown in order to control three or more infeed conveyor clamps and the associated pusher such as shown in FIG. 5 so that cartons will feed from only those conveyors which have a sufficient build-up of cartons thereon.

In FIG. 5, in addition to the infeed conveyors 10 and 12, a third conveyor 97 is provided along with a third article withholding device 99, and switches LS–7 and LS–8 functionally corresponding, respectively, to switches LS–5 and LS-1. It may also be appreciated that the device is fully automatic in its operation, being selective to feed cartons only from those infeed conveyors where there is a sufficient build-up to ensure that the pressure of the cartons on the conveyor having the build-up will urge the leading carton or cartons into the transfer area ahead of the pusher with sufficient force to ensure that the carton properly positioned ahead of the pusher prior to the extension of the pusher to urge the cartons ahead of it onto the discharge conveyor.

It will also be appreciated from the foregoing description that, broadly, the invention comprehends the provision of a transfer area A adjacent which are a plurality of article-accumulating stations (the downstream ends of infeed conveyors 10 and 12) with transfer means 30 for transferring articles from the transfer area that enter it from the accumulating stations, and with conveying mechanism, including conveyor belts 10 and 12 and the withholding devices 40 and 50, for delivering or withholding delivery of articles in the accumulating stations to the transfer area. A control system is coupled with the transfer means 30 and with the conveying mechanism (withholding devices 40 and 50) and which is responsive to the accumulation of a determined number of articles in any accumulation station to cause transfer of articles from such station to the transfer area and withhold the transfer of articles from such station as contains less than such determined number of articles.

What I claim is:

1. A machine for transferring articles for the purpose described comprising, in combination: an article transfer area; article transfer means movable through the area to sweep articles therefrom; a plurality of article infeed conveyors disposed in article discharge relation with said area at spaced intervals along the direction of movement of the transfer means; article withholding means adjacent the discharge end of each infeed conveyor; control means coupled with said withholding means and having a part associated with each infeed conveyor and responsive to a predetermined accumulation of articles thereon awaiting discharge to the transfer area, said control means including another part responsive to the presence of the transfer means at a determined position, said control means operable when said parts sense the simultaneous presence of the transfer device at said determined position and the predetermined accumulation of articles on any of said infeed conveyors to actuate only the withholding means associated with such infeed conveyors as individually contain said predetermined accumulation to release the accumulated articles for discharge to the area and subsequent transfer from the area by the transfer means.

2. A machine for transferring articles for the purpose described comprising, in combination: and article transfer area; periodically operative article transfer means movable in a cycle of operation through the area to sweep articles therefrom; a plurality of article infeed conveyors disposed in article discharge relation with said area at intervals along the direction of movement of the transfer means; article withholding means adjacent the discharge end of each infeed conveyor; control means coupled with said transfer means to start and stop the cycle of movement thereof and coupled with said withholding means and having portions responsive to the simultaneous presence of the transfer means at a starting position in its cycle of operation and the accumulation or lack of accumulation of a predetermined number of articles on each conveyor to cause the withholding means to release the articles on those conveyors containing such predetermined accumulation for discharge to the transfer area and prevent the discharge of articles from any conveyor having less than such predetermined accumulation and start the cycle of operation of the transfer means, and said control system responsive to the completion of the cycle of operation of said transfer means to stop movement thereof.

3. Apparatus for the purpose described comprising: a plurality of article infeed conveyors susceptible to delivering articles at different rates, an article transfer area at the discharge ends of and common to said conveyors, article transfer means movable through the area to sweep articles therefrom, article withholding means at the discharge end of each conveyor for preventing or allowing the discharge of articles from the conveyors to the transfer area, and a control system coupled with said withholding means and responsive to the accumulation of articles on each conveyor upstream of the withholding means and operable to release articles from the conveyors for discharge to the transfer area at a rate preventing article accumulation on any individual conveyor beyond a predetermined limit and simultaneously to prevent article discharge from any individual conveyor at a rate depleting the accumulation on such individual conveyor below a determined limit.

4. Apparatus for the purpose described comprising: a plurality of article infeed conveyors susceptible to delivering articles at different rates, an article transfer area at the discharge ends of and common to said conveyors, article transfer means movable periodically through the area to sweep articles therefrom, article withholding means at the discharge end of each conveyor for preventing or allow the discharge of articles from the conveyors to the transfer area, and a control system coupled with said transfer means and with said withholding means and responsive to the predetermined accumulation of articles on each conveyor upstream of the withholding means to cause the withholding means to release articles from each conveyor having such predetermined accumulation and initiate the periodic movement of the transfer means to sweep the articles entering the transfer area from such conveyor out of the area and simultaneously cause the withholding means to prevent discharge of articles from a conveyor having less than said predetermined accumulation thereon.

5. Apparatus for the purpose described comprising, in combination: an article transfer area to which articles are delivered and from which they are removed; a pusher reciprocable through said area in a cycle of operation between extended and retracted positions to push articles from the area when extended and allow articles to discharge into the area ahead of the pusher when retracted; a plurality of infeed conveyors disposed in article discharge relation adjacent said area and spaced along the direction of pusher movement; article withholding means at the discharge end of each conveyor for preventing or allowing the discharge of articles from the conveyors into said area; a control system coupled to said pusher and withholding means and responsive to a predetermined accumulation of articles on each conveyor when the pusher is in one of said positions to cause said withholding means to release articles for discharge to said transfer area from only such conveyors as have said predetermined accumulation and initiate a cycle of operation of said pusher.

6. Apparatus for the purpose described comprising, in combination: an article transfer surface to which articles are delivered and from which they are removed; transfer means periodically operable across said surface in a cycle of movement to remove articles therefrom, said cycle of movement of the transfer means having a first portion during which the transfer means moves to a position at which articles enter upon the transfer surface and a second portion during which articles are transferred off of said surface; a plurality of article infeed conveyors disposed in article discharge relation with the transfer surface at intervals spaced along the direction of movement of the transfer means; article discharge blocking means operatively associated with said transfer means for preventing the discharge of articles from the infeed conveyors to the transfer surface during the article transfer portion of the cycle of movement of the transfer means;

extensible and retractable article withholding mechanism adjacent the discharge end of each infeed conveyor and in the extended position withholding discharge of articles to said surface and in the retracted position allowing the discharge of articles onto said transfer surface; control apparatus operatively connected to said transfer means and to said withholding mechanism and having a portion adjacent each infeed conveyor responsive to a predetermined accumulation of articles on each infeed conveyor to retract the article withholding mechanism associated with the conveyor having the predetermined accumulation and initiate the cycle of movement of the transfer means to allow articles to enter upon the transfer surface from such conveyor during said first portion of the cycle movement of the transfer means, said control apparatus responsive to the completion of the cycle of movement of said transfer means and the simultaneous presence of a predetermined accumulation of articles on the infeed conveyors to retract said withholding mechanism at each infeed conveyor having said predetermined accumulation and extend such withholding mechanism at each infeed conveyor having less than said predetermined accumulation and initiate the next cycle of movement of the transfer means.

7. Apparatus for the purpose described comprising, in combination, a pair of article infeed conveyors, an article outfeed conveyor, a transfer area common to the discharge ends of the infeed conveyors and the inlet end of the outfeed conveyor, transfer means supported for movement through the transfer area to sweep articles therefrom entering from the infeed conveyors on toward the outfeed conveyor, withholding means at the discharge end of each infeed conveyor operable to permit or prevent article discharge to the transfer area, a control system coupled to the transfer means and withholding means and responsive to the delivery rate of articles on the individual infeed conveyors to regulate the operation of the transfer means to accommodate the delivery rate of articles on that infeed conveyor having the highest delivery rate to prevent excessive article accumulation on such conveyor, and said control system responsive to a slower delivery rate on the other infeed conveyor to actuate the article withholding means associated with such conveyor to prevent the delivery of articles by such conveyor to the transfer area until such number of articles have accumulated on such conveyor to assure a discharge to the transfer area at a rate corresponding to the higher delivery rate of the other conveyor.

8. Apparatus for the purpose described comprising, in combination: an article transfer area; an article guide wall extending along one side of the transfer area; a plurality of article infeed conveyors disposed in articles discharge relation with said area at that side thereof opposite said wall to discharge articles into said area and against the wall; article transfer mechanism supported for movement through said area from one end thereof to the other parallel said wall and between the wall and the discharge ends of said conveyors to sweep out of the area, during its movement, articles disposed in the area in abutment with said wall and in line with and abutting articles on said conveyors; and said wall having portions offset away from the discharge ends of the conveyors with the offset upstream of the direction of transfer movement by said transfer mechanism being greater than the offset downstream thereof.

9. Article transfer apparatus comprising, in combination: an article transfer area from which articles are to be transferred, a pair of article accumulating stations disposed adjacent the transfer area and from which accumulated articles are delivered to the transfer area, mechanism associated with each accumulating station to selectively transfer articles therefrom to the transfer area or withhold transfer of articles from such station, transfer means associated with the transfer area to transfer articles therefrom delivered by said mechanism from the accumulating stations, and a control system coupled to the transfer means and said mechanism and responsive to the accumulation of a determined number of articles in the stations to actuate the mechanism to transfer articles from such station as contains said determined accumulation and withhold transfer of articles from such station as has less than such determined accumulation and actuate the transfer means to transfer articles entering the transfer area from the accumulating station.

10. That method of transferring articles to an outfeed conveyor from a plurality of infeed conveyors delivering articles at varying rates, comprising: delivering articles from the highest delivery rate infeed conveyor to an article transfer area; withholding delivery from a slower delivery rate infeed conveyor to the transfer area to accumulate a group of articles on such conveyor; periodically delivering articles from the accumulated group to the transfer area when the group reaches a determined size; and transferring articles from the transfer area to the outfeed conveyor whenever articles from either or both of said infeed conveyors are delivered to the transfer area.

References Cited in the file of this patent

UNITED STATES PATENTS

| | | |
|---|---|---|
| 1,980,411 | Kimball | Nov. 13, 1934 |
| 2,603,340 | Warren | July 15, 1952 |
| 2,790,531 | McVicker | Apr. 30, 1957 |
| 2,801,728 | Temple | Aug. 6, 1957 |
| 3,025,979 | Segur | Mar. 20, 13962 |